United States Patent [19]

Zabler et al.

[11] Patent Number: 5,438,870
[45] Date of Patent: Aug. 8, 1995

[54] ROTATION RATE SENSOR

[75] Inventors: Erich Zabler, Stutensee; Jiri Marek, Reutlingen, both of Germany

[73] Assignee: Robert Bosch GmbH, Stuttgart, Germany

[21] Appl. No.: 175,595

[22] Filed: Dec. 30, 1993

Related U.S. Application Data

[62] Division of Ser. No. 758,746, Sep. 12, 1991, Pat. No. 5,275,047.

[30] Foreign Application Priority Data

Oct. 13, 1990 [DE] Germany .......... 40 32 559.8

[51] Int. Cl.$^6$ .......... G01P 9/04
[52] U.S. Cl. .......... 73/504.02
[58] Field of Search .......... 73/505, 510

[56] References Cited

U.S. PATENT DOCUMENTS

| | | | |
|---|---|---|---|
| 4,654,663 | 3/1987 | Alsenz et al. | 73/505 |
| 4,750,364 | 6/1988 | Kawamura et al. | 73/510 |
| 5,025,346 | 6/1991 | Tang et al. | 73/517 AV |

FOREIGN PATENT DOCUMENTS 2156523 10/1985 United Kingdom.
2186085 8/1987 United Kingdom.

*Primary Examiner*—John E. Chapman
*Attorney, Agent, or Firm*—Frishauf, Holtz, Goodman & Woodward

[57] ABSTRACT

A rotation rate sensor has a multi-layer structure including a monocrystalline silicon layer (10) which forms a carrier structure and a polysilicon layer (21), forming a second layer, and which includes a structural element (30) which acts as an oscillatory body. This structural element (30) is supported on the carrier structure (10) by a plurality of support strips (31), and is deflectable (2) perpendicularly to the major surface of the carrier structure (10). Capacitative or piezo-resistive detecting elements are formed from the second layer for detecting Coriolis force deflections (2), perpendicular to the major surface of said carrier (10) of the structural element (30).

4 Claims, 3 Drawing Sheets

ROTATION RATE SENSOR

This is a division of application Ser. No. 07/758,746 filed Sep. 12, 1991, now U.S. Pat. No. 5,275,047.

Cross-reference to related patents and applications, assigned to the assignee of the present invention, the disclosures of which are hereby incorporated by reference:

U.S. Pat. Nos. 4,522,067 and 4,620,365, BURGER.

U.S. Pat. No. 4,955,234, MAREK, issued Sep. 11, 1990=DE 38 14 952.

ENGELSDORF & METTNER, German Patent Disclosure DE-OS 39 19 876, publ. Dec. 20, 1990, and corresponding PCT/DE90/00366 whose U.S. national phase is U.S. Pat. No. 5,161,774, Nov. 10, 1992;

U.S. Ser. No. 07/566,997, METTNER et al., filed Aug. 13, 1990, and corresponding PCT/EP90/01297, publ. as WO 91-02169;

German Patent Disclosure DE 40 16 471.3 and corresponding U.S. Ser. No. 07/701,781, BANTIEN, filed May 17, 1991, now U.S. Pat. No. 5,148,604;

German Patent Application P 40 22 495.3, filed July 1990.

Cross-Reference to Other Related Patents

U.S. Pat. No. 4,836,023, OIKAWA/YAZAKI CORP., 6 JUN. 1989, entitled VIBRATIONAL ANGULAR RATE SENSOR;

U.S. Pat. Nos. 4,549,926 and 4,578,142, CORBOY JR. et al/RCA;

U.S. Pat. No. 4,585,513, GALE et al/RCA, issued 29 APR. 1986;

U.S. Pat. No. 4,658,495, FLATLEY & IPRI/RCA, issued 21 APR. 1987;

U.S. Pat. No. 4,698,132, DENNIS/RCA, issued 6 OCT. 1987;

German Patent DE-PS 36 25 411, SEIDEL, 11 NOV. 1988, assigned to Messerschmidt-Bökow-Blohm GmbH.

Cross-Reference to Related Literature

Walter Kern, "Chemical Etching of Silicon, Germanium, Gallium Arsenide, and Gallium Phosphide", RCA REVIEW, June 1978, Vol. 39, pp. 278–308.

W. C. Tang et al., "Laterally Driven Polysilicon Resonant Microstructures", Vol 20, Sensors & Actuators, pages 53–59, IEEE 1989.

FIELD OF THE INVENTION

The present invention relates generally to rotation rate sensors and, more particularly, to a sensor with a tuning fork structure, preferably made by etching a semiconductor wafer.

BACKGROUND

It is already known to use sensors to detect low rotation rates, on the order of a few degrees per second, for example in measuring the rotation rate of a motor vehicle about its vertical yaw axis, for control of travel dynamics or for navigation purposes. In such known sensors, a tuning fork structure, oriented parallel to the rotation axis, is stimulated or excited to oscillate in a plane perpendicular to the rotation axis. Such sensors must take into account the so-called "Coriolis" force caused by rotation of the earth. In case of rotation about the rotation axis, Coriolis forces are exerted on the oscillating tuning fork tines perpendicular to the rotation axis and perpendicular to the direction of excitation, i.e. to the deflection of the tines in the absence of a rotary motion. One can detect and evaluate the rotation rate by adjusting for the Coriolis-force-induced deflection of the tines perpendicular to the direction of excitation.

German Patent Application P 40 22 495.3 (Bosch docket R. 23632), filed July 1990, and corresponding U.S. Ser. No. 07/988,966.SEIPLER+, describes various embodiments of a rotation rate sensor having a sensor element structured from a monocrystalline silicon wafer and at least one oscillating body, preferably a pair of them, connected over one or more rods to a fixed frame. The oscillating bodies are capable of oscillating in two respectively perpendicular directions. The application describes various excitation possibilities of the oscillating body in a first oscillation direction lying in the wafer plane, for example electromagnetic excitation, thermomechanical excitation, and various possibilities for electrostatic excitation. This rotation rate sensor is equipped with means for detection of deflections of the oscillating body in the second oscillation direction.

The article "Laterally Driven Polysilicon Resonant Microstructures" by William C. Tang, Tu-Cuong H. Nguygen and Roger T. Howe in Sensor and Actuators, 20 (1989) 25–32 describes various polysilicon structures which can be oscillated and supported on carriers, and describes methods for their manufacture.

THE INVENTION

The sensor of the present invention has the advantage that the oscillating body can be formed with a high height/breadth ratio, according to the thickness of the carrier, so that large deflection in a first oscillation direction can be achieved, while simultaneously substantially avoiding transverse deflections which cause noise signals. This special form of the oscillating body enables a rigid, precise, and noise-suppressing guidance in the first oscillation direction. Simultaneously, the structural elements, deflectable normal to the first oscillation direction, which elements are located on the oscillating bodies and which serve as acceleration sensors for the Coriolis acceleration normal to the first oscillation direction, can be so formed that they have great sensitivity.

It is particularly advantageous to connect the acceleration sensitive structural elements to the oscillating body via strips aligned parallel to the first oscillation direction. This permits substantially avoiding transverse deflections of the structural elements caused by the motion of the oscillating body.

The construction of the sensor with integrated capacitive or piezoresistine deflection detectors has the advantage that the sensor's overall dimensions can be very small. The measurement effect of the sensor of the invention can be positively amplified by stimulation of the oscillating body to oscillations of higher frequency and by a maximally large deflection of the structural element normal to the first oscillation direction of the oscillating body.

It is particularly advantageous to use, as the carrier, a monocrystalline silicon wafer with (110) or (100) crystal orientation, since this can be readily structured using dry- or wet-chemical etching techniques well-known in micromechanics. As oscillating bodies, rods with walls formed normal to the wafer surface are particularly suitable. They can be simply structured by anisotropic electrochemical etching using KOH (potassium hydroxide) from (110)-oriented silicon wafers.

By dry chemical etching (trenching), embodiments independent of the crystal orientation can be produced. As oscillatory structural elements, those made from polysilicon structures or structures of monocrystalline silicon are particularly suitable, since they can be made using known thin-film technology methods, and have high sensitivity.

The manufacture of the rotation rate sensor of the present invention in silicon is particularly advantageous since it permits integration of the associated evaluation circuit on the sensor element itself.

DRAWINGS

FIG. 1 is a perspective view of a section of a sensor element according to the present invention;

FIGS. 2a, 2b, 2c, and 2d are various embodiments of a structural element; and

FIG. 3 is a perspective view of a section of a further sensor element.

DETAILED DESCRIPTION

Figure 1:
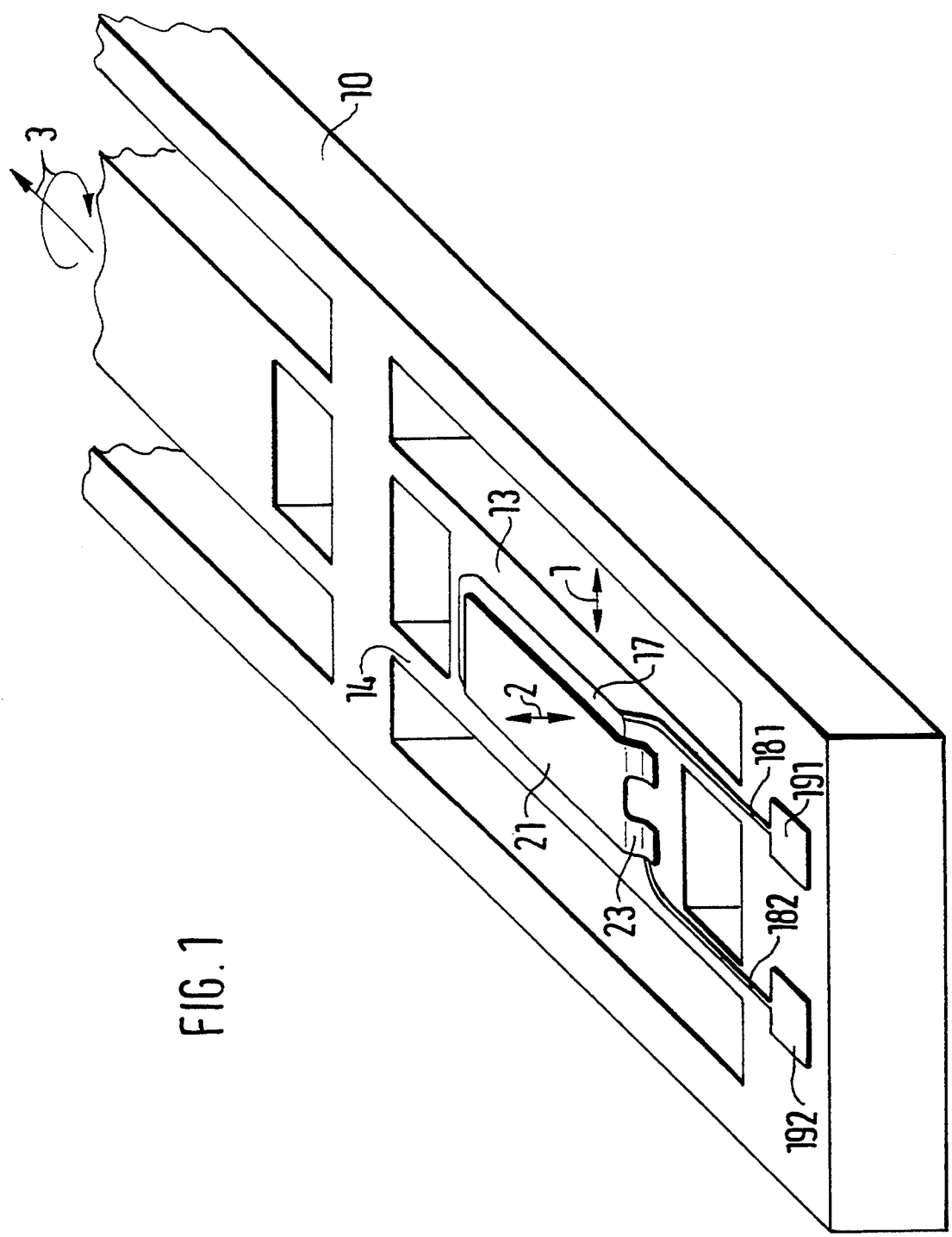

FIG. 1 illustrates a section of a sensor element in the form of a double tuning fork structured from an originally disk-shaped substrate or carrier 10 such as a semiconductor wafer. A first side of the tuning fork structure consists of an oscillating body or plate 13, connected on two opposing sides via four supporting strips or rods 14 with the rest of carrier 10. Both oscillating body 13 and hanger rods 14 are formed with the full thickness of carrier 10. Of course, it is possible to connect oscillating body 13 by rods 14 to carrier 10 only on one side, so that an open tuning fork structure is created. With the aid of means not detailed in the drawing, oscillating body 13 can be stimulated to oscillations in a first oscillation direction (left-right), in the carrier plane, as indicated by arrow 1. This drive means can be, for example, electrostatic, electrodynamic, or thermoelectric, as described in the above-cited German application P 40 22 and U.S. Ser. No. 07/988,966.

A tongue-like structural element 21 is mounted on oscillating body 13 by means of supporting strips 23. Tongue 21 is oriented parallel to the carrier or substrate surface, and is deflectable perpendicular to the substrate surface, so that accelerations perpendicular to the substrate surface can be detected. If body 13 oscillates in a first direction 1, and the sensor element undergoes rotation about an axis 3 (FIG. 1), which is normal to first oscillation direction 1 and normal to deflection direction 2 of tongue 21, a Coriolis acceleration normal to the substrate surface acts on tongue 21, in direction 2.

This Coriolis acceleration, which deflects tongue 21, can be detected either capacitively, as shown in FIG. 1, or piezo-resistively using piezo-resistances mounted on tongue 21. For capacitive measurement, a tongue 21-adjacent surface of oscillating body 13 is prepared as an electrode side 17 of a plate capacitor, connected via a lead 181 to a terminal 191. The other electrode side of the plate capacitor is formed by tongue 21 itself, which is connected via lead 182 to terminal 192. A deflection of tongue 21 along axis or direction 2 leads to a capacitance change of this plate capacitor, and this change can be evaluated by a standard evaluation circuit (not shown).

It is particularly advantageous for the sensor element structure shown in FIG. 1 to be made from monocrystalline silicon carriers 10, and polysilicon structures or monocrystalline silicon structures based thereon. Oscillating body 13 and support strips 14 may be simply structured from the silicon substrate or carrier 10 by dry- or wet-chemical etching. For example, this can be accomplished by electrochemical etching of a membrane and subsequent structuring of this membrane.

For creation of structures with sidewalls perpendicular to the carrier surface, silicon wafers with (110) orientation are particularly suitable, since the structures can be created by wet chemical etching using KOH (potassium hydroxide). By use of dry chemical etching (trenching), such support rods can also be made, independent of the crystal orientation. The oscillatory structural elements on the oscillating bodies 13, and their connecting rods to the carrier substrate can advantageously be made in polysilicon or monocrystalline silicon. Deposit of silicon on an auxiliary layer, e.g. an oxide layer which serves as a so-called "sacrificial layer" and which subsequently is again removed by underetching of the silicon structure, permits making thin structural elements which offer high sensitivity in the rotation rate sensor. Suitable structural elements include not only tongues oriented parallel to the carrier surface, but also plates fastened at two ends, bridge-like, on the oscillator.

The manufacture of the sensor element of the present invention in silicon permits the integration of parts of the evaluation circuit on the sensor element. Particularly advantageous in this connection is the fact that an electrode side of the plate capacitor, formed on the surface of oscillating body 13, can be made by simple diffusion into the carrier substrate. The same goes for conductive leads 181, 182.

Figure 2A:
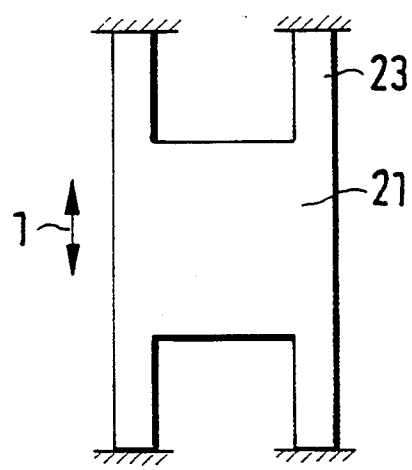
Figure 2B:
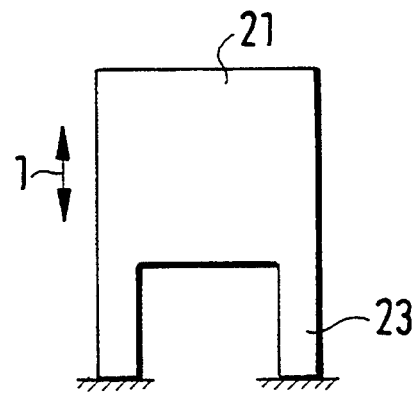
Figure 2C:
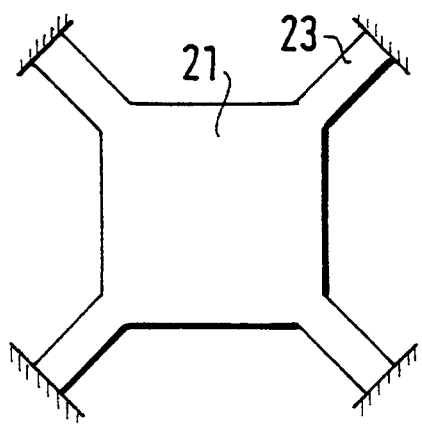
Figure 2D:
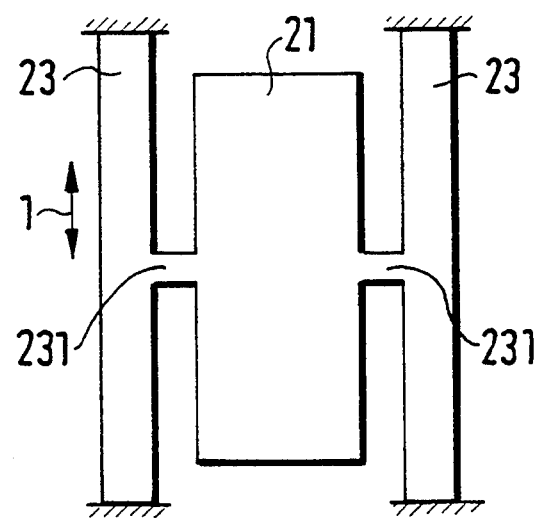

FIGS. 2a, 2b, 2c, and 2d illustrate various embodiments of structural element 21 with associated hanger rods 23. Depending upon the application, one can use a single-sided hanging, see FIG. 2b, a two-sided hanging, see FIGS. 2a and 2d, or even a four-sided hanging, as shown in FIG. 2c.

If structural element 21 serves only as acceleration recipient for the Coriolis acceleration, this means it is located on an oscillator 13 structured from a carrier 10, so it is particularly neat to arrange the hanger strips 23 parallel to the first oscillation direction 1, shown by arrow 1. Thus one can largely avoid disruptive transverse deflections of structural element 21 in the first excitation direction 1.

The four-sided hanging of structural element 21 shown in FIG. 2c, using four radially arranged hanger strips 23, is advantageous since this suppresses all transverse deflections equally. The acceleration sensitivity perpendicular to the surface of oscillating body 13 can also be advantageously increased by forming structural element according to FIG. 2d. Structural element 21 is here connected to oscillating body 13 on two sides using strips 23. The connection of the acceleration-sensitive plate 21 with strips 23 is not direct, but rather is formed by two thin flexible bars 231.

Figure 3:
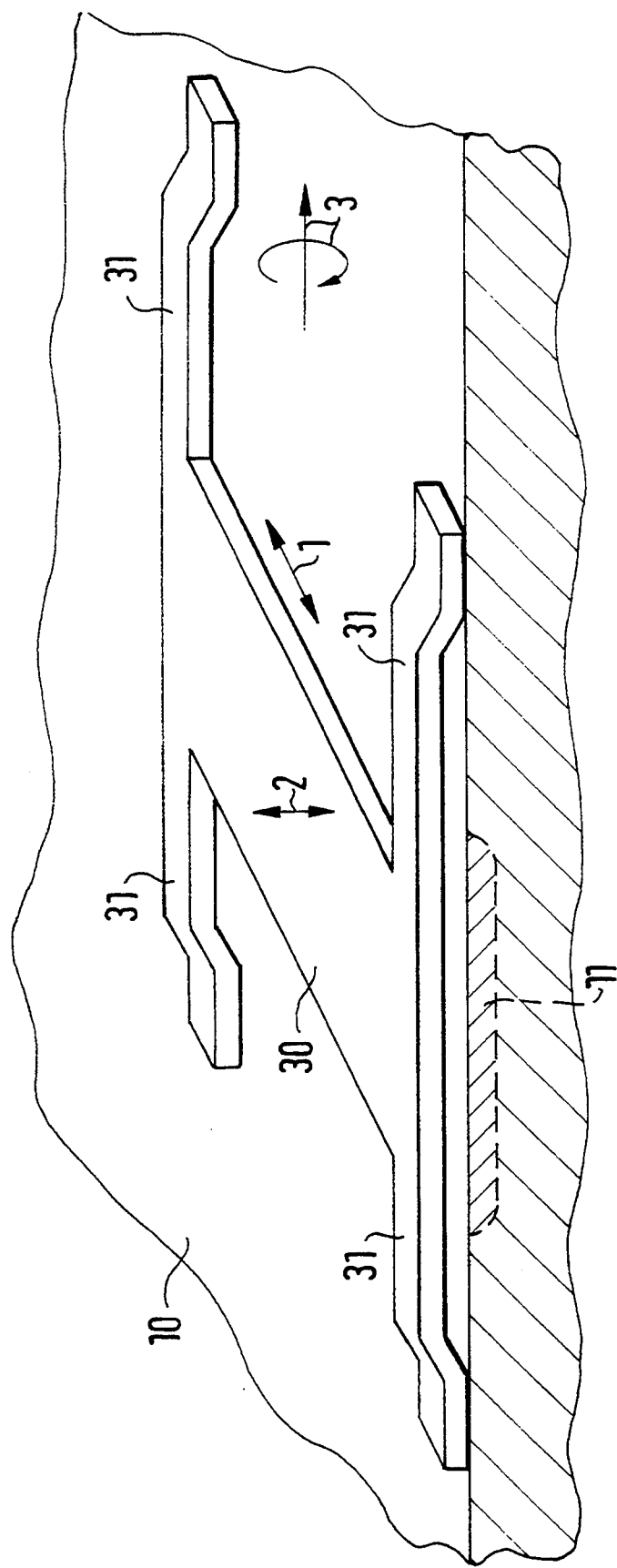

FIG. 3 illustrates another embodiment of a sensor element, with a carrier 10, shown broken away. According to this embodiment, carrier 10 is not structured. It can be either a monocrystalline silicon wafer or another substrate, on which, in suitable fashion, structural elements and means for signal acquisition can be placed. On carrier 10, a bridge-like structure is placed. It comprises essentially a plate-like seismic mass 30, connected via four strips 31 to the carrier substrate. This structure can be stimulated to oscillate in a first oscillation direction, indicated by arrow 1, for example electrostaticly. The drive or stimulation means are conventional and are not detailed here. Upon rotary motion of the sensor element about an axis 3, in the carrier plane and normal to the first oscillation direction, a Coriolis force acts on the oscillatory seismic mass 30 normal to the carrier surface. The thereby resulting deflection of the seismic mass 30 normal to the carrier surface can be piezoresistively or capacitively detected and is a measure for the angular velocity of the rotation.

The sensor element shown in FIG. 3 is preferably silicon. A charge carrier diffusion into carrier 10 is indicated at 11. This serves to electrically isolate, from plate-like seismic mass 30, a part of the surface of the carrier located under the plate-like seismic mass 30. This part of the surface forms, together with seismic mass 30, a capacitor. One can measure deflection of seismic mass 30, in a second oscillation direction normal to the carrier surface, by the changes in capacitance.

Various changes and modifications are possible within the scope of the inventive concept. In particular, features of one embodiment may be combined with features of another embodiment.

We claim:

1. Rotation rate sensor with a multi-layer sensor element having first and second layers (10, 21), wherein
    said first layer is a generally planar carrier (10) of monocrystalline silicon having a major surface;
    said second layer (21) comprises polysilicon and defines at least one structural element (30) which acts as an oscillatory body, being capable of oscillation in at least a first oscillation direction (1) oriented parallel to said major surface of said planar carrier (10),
    said structural element (30) is supported on said major surface of said planar carrier (10) by a plurality of support strips (31),
    said structural element (30) is deflectable (2) normal to said major surface of said carrier (10); and
    further comprising capacitive or piezoresistive detecting means (17, 181; 21, 182) for detecting Coriolis force deflections (2), perpendicular to said major surface of said carrier (10), of said structural element (30), formed from said second layer.

2. Sensor according to claim 1,
    wherein said carrier (10) consists essentially of a material selected from the group consisting of (110)-oriented monocrystalline silicon and (100)-oriented monocrystalline silicon.

3. Sensor according to claim 1, wherein said structural element (21, 30) is a product made by the process of
    depositing a polysilicon layer on portions of the surface of said carrier to form an auxiliary layer, and
    subsequently underetching the thus-deposited auxiliary layer.

4. Rotation rate sensor with a multi-layer sensor element having first and second layers (10, 21), wherein
    said first layer is a generally planar carrier (10) of monocrystalline silicon having a major surface;
    a charge carrier diffusion (11) is formed in a portion of said major surface;
    said second layer (21) comprises polysilicon and defines at least one structural element (30) which acts as an oscillatory body, being capable of oscillation in at least a first oscillation direction (1) oriented parallel to said major surface of said planar carrier (10), and
    said charge carrier diffusion (11) and said oscillatory body define respective plates of a capacitor which serves to measure movement of said oscillatory body (30) in a direction normal to said major surface of said carrier (10).

* * * * *